Oct. 28, 1924.
J. H. HAMMOND, JR
1,513,108
SYSTEM FOR CONTROL OF MOVING BODIES BY RADIANT ENERGY
Original Filed June 6, 1914
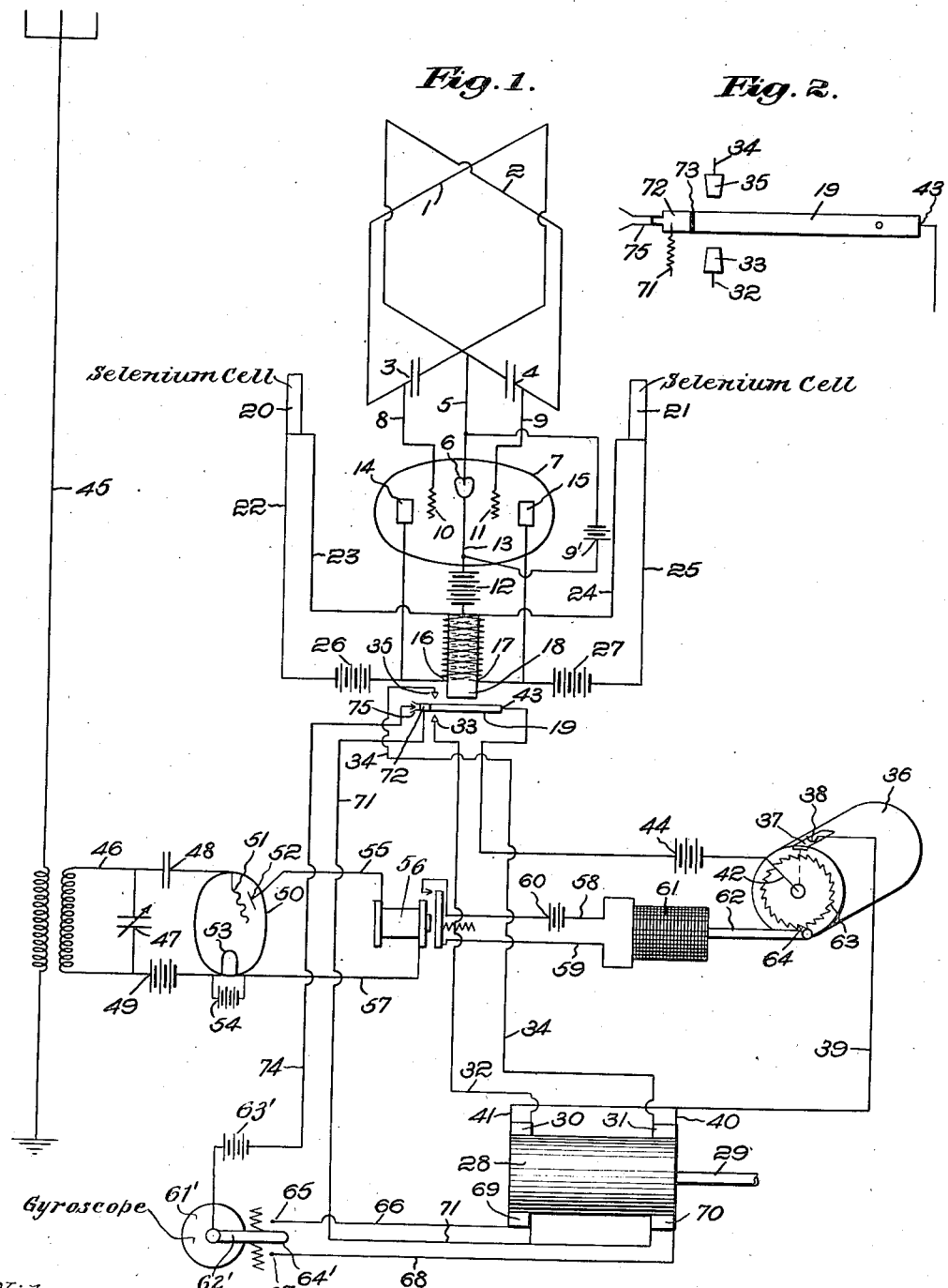

Patented Oct. 28, 1924.

UNITED STATES PATENT OFFICE.

JOHN HAYS HAMMOND, JR., OF GLOUCESTER, MASSACHUSETTS.

SYSTEM FOR CONTROL OF MOVING BODIES BY RADIANT ENERGY

Application filed June 6, 1914, Serial No. 843,562. Renewed July 24, 1923.

*To all whom it may concern:*

Be it known that I, JOHN HAYS HAMMOND, Jr., a citizen of the United States, and a resident of Gloucester, in the county of Essex and State of Massachusetts, have invented an Improvement in Systems for Control of Moving Bodies by Radiant Energy, of which the following description, in connection with the accompanying drawings, is a specification, like characters on the drawings representing like parts:

This invention relates to the control of moving bodies by radiant energy, and particularly to the control of vessels, such as torpedo boats. The movable body may, however, be of any suitable character, such as a boat, air craft, vehicle or mechanism having suitable moving parts.

In order that the principle of the invention may be readily understood, I have in the accompanying drawing disclosed diagrammatically one form or type of apparatus by which my invention may be practised.

In the drawings,—

Fig. 1 is a diagrammatic representation of a system for practising my invention; and Fig. 2 is a detail of one form of armature preferably employed therewith.

In my co-pending application for system of radio-direction control, Serial No. 702,174, filed June 7, 1912, I have disclosed certain forms of apparatus by which the movements of bodies or mechanisms are controlled or directed by radiant energy, such as light waves, radiant heat waves, ultra-violet waves, electromagnetic waves or sound waves. In particular, I have therein disclosed certain forms of orientation mechanism, whereby the moving body or apparatus containing or having such mechanism will be attracted when the enemy employs interfering radiant energy, such, for example, as a beam from a searchlight or electromagnetic waves. In accordance with my present invention, I provide means, preferably responsive to radiant energy from a distant control station, whereby the responsiveness of the moving body or apparatus to such interfering radiant energy is wholly permissive and under the control of the operator at the distant control station or other suitable point.

If the moving body equipped with a suitable type of orientation apparatus be a torpedo boat or other vessel, said vessel may, in accordance with my invention, be permitted to be responsive to or to turn in the direction of the source of interfering radiant energy, but only at such times as are determined by the operator at the control station, who preferably, by the employment of electromagnetic waves, may at any time render said orientation mechanism non-responsive to or unaffected by such interfering radiant energy of whatever type. I also preferably provide means whereby when the vessel or other moving body is not subjected to the action of interfering radiant energy, as, for example, when the enemy is not directing a beam of a searchlight thereupon, the said vessel is under the control of direction-maintaining means, preferably in the form of a suitable controller, such, for example, as a gyroscope. Preferably I provide means whereby when the vessel or other moving body is permitted by the operator at the distant control station to be responsive to interfering radiant energy, the said controller is automatically relieved of its control of said vessel or body, such control being re-established at any suitable time.

Referring more particularly to the drawings wherein I have wholly diagrammatically indicated one type of apparatus embodying my invention, it will be understood that the apparatus is suitably mounted upon a moving body, such, for example, as a vessel that is provided with suitable propelling means and with steering mechanism under the control of the apparatus hereinafter set forth.

Inasmuch as the so-called orientation mechanism may be of a type that is responsive to different forms of interfering radiant energy, I have herein represented two forms of orientation mechanism, with both of which, if desired, the vessel may be equipped. One form of such mechanism is responsive to electromagnetic waves and the other illustrated form is responsive to light waves.

Referring first to that form of apparatus responsive to electromagnetic waves, I have represented two closed loop antennæ 1 and 2, respectively containing condensers 3, 4 and each connected at one side of said condensers as at 5 to the filament 6 of a suitable gaseous detector 7, such, for example, as the so-called audion. At the other side of said condensers 3 and 4, the said loop antennæ are connected by conductors 8, 9 to the grids 10, 11 of said gaseous detector. The said filament 6 is externally connected to a battery 12 by a suitable conductor 13.

The plates 14, 15 of the gaseous detector are connected in series with the differential windings 16, 17 of a differential relay 18, mounted in suitable relation to which is an armature 19, said differential windings being connected to said battery 12. The filament 6 is heated by a local battery 9' in circuit with the conductors 5 and 13.

The directive force of the closed loop antennæ is well understood in the art of radio transmission of energy, as is also the fact that the phase of the electrical oscillations received in the loops varies according to the orientation of the loops with respect to the source of energy. The value of the negative charge upon the grids 10 and 11 will vary according to the amount of energy stored in the condensers 3, 4, and the value of the negative charge accumulated upon the said grids will, as is well understood, determine the amount of the flux current traversing the gaseous detector from the filament 6 to the plates 14 and 15. Therefore, the differential windings 16 and 17 of the differential relay are more or less energized according to the phase relation of the high frequency electric currents in the loops 1 and 2, such phase relation depending, as stated, upon the orientation of the loops with respect to a source of electromagnetic wave propagation. Such source of electromagnetic wave propagation may be upon a vessel or other object belonging to an enemy, but within the range and scope of my invention such electromagnetic wave propagation may emanate from any source. I have also represented as connected with the differential windings 16 and 17 of the differential relay, selenium or like cells 20, 21, the conductivity whereof is affected in well known manner by light waves. The said selenium cells 20, 21 are connected by suitable conductors 22, 23 and 24, 25 to the said differential windings 16, 17 of the differential relay, batteries 26, 27 or other suitable sources of energy being located in the circuits to which said conductors 22, 23 and 24, 25 respectively pertain.

The said selenium cells 20, 21 are situated symmetrically with respect to the longitudinal axis of the torpedo boat or other moving body, and will have some suitable opaque object or screen positioned between them, so as to cause a shadow to be cast on either of the said cells 20, 21 according to the orientation of the vessel with respect to a source of light, such, for example, as the searchlight of an enemy. With variation of intensity of illumination, the conductivity of the selenium cells 20, 21 varies, and likewise the current through the differential windings 16, 17 of the differential relay will vary.

As previously stated, the moving body may be equipped with both forms of orientation apparatus, which are herein represented as illustrative examples merely of the use of my invention. Therefore the moving body will be responsive to interfering radiant energy, whether it be electromagnetic waves or light waves. My invention is not, however, limited to the employment of orientation mechanism responsive only to such forms of radiant energy, since apparatus responsive to other forms, such, for example, as sound waves, may be employed.

The position of the armature 19 is determined through energization of the differential relay 18 by the currents passing through the differential windings 16, 17, the said currents being in turn dependent upon the orientation of the loops 1, 2 or the intensity of the light waves to which the selenium cells 20, 21 are subjected.

At 28, I have represented a cylinder having mounted therein a piston, the piston rod 29 of which is connected to the rudder or other steering apparatus of the vessel or other moving body. Fluid under pressure, such, for example, as compressed air, is adapted to be admitted from any suitable source or reservoir at opposite sides of the piston through valve mechanism indicated generally at 30, 31, and which need not be particularly disclosed, as it may be of the nature shown in applications previously filed by me.

Preferably, however, I provide suitable means for admitting compressed air at either side of the piston and for suitably exhausting the air from the other side thereof, so as to turn the rudder to starboard or to port. Any other suitable controlling mechanism may, however, be employed. The valve mechanisms 30, 31 may be of any suitable nature, but preferably they are electrically controlled. For this purpose, I have represented the valve mechanism 30 as having suitably connected therewith a conductor 32 provided with a terminal 33 positioned beneath the armature 19 and with which the armature contacts upon suitable energization and movement away from the differential relay 18. Likewise the valve mechanism 31 is provided with a suitable conductor 34 having a suitable terminal 35 positioned above the armature 19, so that the armature will contact therewith when moved toward the differential relay upon suitable energization thereof.

At any suitable point, I provide a suitable controller, such, for example, as an electric or pneumatic commutator 36 having thereon a suitable contact 37, or if desired a series of such contacts.

Adapted to engage with said contact or series of contacts 37 is a suitable brush 38 leading from which is a conductor 39 connected at 40, 41 respectively to the said valve mechanisms 31, 30.

Also leading from the commutator 36 is a suitable conductor 42 leading to and connected at 43 with the armature 19, a battery 44 being provided between the commutator and the armature.

When the brush 38 is in engagement with the contact 37, or with any one of such contacts if a series thereof be provided, then upon energization of the differential relay 18, through either the differential windings 16 or 17, then the said armature 19 makes contact either with the terminal 33 or the terminal 35, and accordingly the valve mechanism 30 or the valve mechanism 31 is opened to admit fluid under pressure to either side of the piston in the cylinder 28, the fluid under pressure being exhausted in suitable manner from the opposite side of the said piston. In this manner, the rudder will be turned to starboard or to port, and thus the vessel or other moving body will turn toward the source of interfering radiant energy, whether it be a searchlight or electromagnetic waves or other form of radiant energy.

Equipped with the apparatus thus far described, excepting the commutator 36, the vessel or other moving body will turn at all times toward the source of interfering radiant energy. By reason, however of the employment of suitable interrupting or break apparatus, one form of which is typified by the commutator 36, the vessel or other moving body may be permitted at any time to be responsive to interfering radiant energy, but it may be rendered non-responsive thereto. While this result may be effected in any suitable manner, I preferably equip the vessel or other moving body with an aerial circuit 45 for the receipt of electromagnetic waves from a distant control station, it being understood, however, that I may provide means responsive to any suitable form of radiant energy. Suitably connected with said aerial circuit 45 is a closed oscillatory circuit 46 having therein condensers 47, 48 and battery 49. The said circuit is also provided with a suitable detector, preferably of the gaseous type, and herein represented as a so-called audion 50. The latter is provided with a grid 51, a plate 52 and a filament 53 in circuit with which latter is a local battery 54 to effect heating of the filament. The grid 51 is connected in any suitable manner to the closed oscillatory circuit and the anode or plate 52 is suitably connected by conductor 55 to a relay 56, also connected by conductor 57 with the filament 53. The action of the said detector need not be more fully described, and any other suitable detector may be employed for the purpose.

The operator at the distant control station, desiring to render the vessel or other moving body non-responsive to and therefore non-controlled by interfering radiant energy sends suitable impulses, whereby the relay 56 is suitably energized. The latter is connected by suitable conductors 58, 59 provided with a battery 60, and with a solenoid 61, the core 62 of which, upon energization of said solenoid, is adapted to impart step-by-step rotation to the commutator 36 in suitable manner, as by the provision of a ratchet 63 suitably mounted upon the commutator and a pawl 64 with which said core 62 is equipped.

By suitably turning the commutator 36 by energization of the solenoid 61, the contact 37 is withdrawn from the brush 38, and hence the circuits pertaining to both the valve mechanisms 30 and 31 are broken, thereby preventing energization of the armature 19 until the contact 37 or some other contact with which said commutator is provided is again brought into contact with the brush 38. Thus, the distant operator may at any time permit the vessel or other moving body to be responsive to and to turn in the direction of the source of interfering radiant energy, or he may render such vessel or other moving body wholly non-responsive thereto for any desired length of time.

In accordance with my invention, I also provide suitable direction-maintaining means which may be a controller of any suitable type, as, for example, a gyroscope. The function of the gyroscope is to maintain the vessel or other moving body upon a predetermined course at such times as the vessel or other body is not responsive to or guided by interfering radiant energy. Therefore, in accordance with the preferred form of my invention, I provide means whereby the control of the vessel by the gyroscope is automatically terminated by the responsiveness of the vessel or other body to interfering radiant energy, provided at such time the operator at the control station permits such responsiveness of the vessel to such interfering radiant energy.

In Fig. 1, I have diagrammatically indicated at 61' a gyroscope of any suitable type, by the movement of which in any suitable manner, as for example, as shown in prior applications filed by me, a conducting arm 62' connected to a battery 63' and provided with a terminal 64' may be placed in contact with the terminal 65 of a conductor 66 or the terminal 67 of a conductor 68. The conductor 66 is suitably connected with a valve mechanism 69 generally similar, it may be, to the valve mechanism 30, and the conductor 68 is suitably connected with a similar valve mechanism 70, preferably similar to the valve mechanism 31 and whereby in suitable manner, motive fluid, preferably air under pressure, may be admitted from any suitable source or reservoir at one side or the other of the piston within the cylinder 28, the motive fluid being suitably exhausted from the opposite side of the piston. Such source of fluid under pressure may be that from which fluid is admitted through the valves 30, 31. Connected with and extending from the valve mechanism 69, 70 is a conductor 71 suitably connected to the end 72 of the armature 19, such end being insulated from that portion of the armature adapted to make contact with the terminals 33, 35, thereby preventing short circuiting. Leading from the battery 63' of the gyroscope 61' is a conductor 74 having a terminal 75 adapted to make contact, as illustrated in Fig. 2, with the end of the armature 19, whereby so long as the differential relay 18 is not energized and hence the vessel or other body is not responding to interfering radiant energy, the circuit of the battery 63' may be completed by the gyroscope through the conducting arm 62' and through either the conductor 66 or the conductor 68 and the return conductors 71 and 74 to open the appropriate valve 69, or 70, thereby admitting motive fluid to the corresponding side of the piston within the cylinder 28, and thereby to maintain the vessel or other moving body upon a predetermined course. When, however, the differential relay 18 is energized, then automatically the circuit controlling the gyroscope 61' is interrupted at 75, so that the vessel or other moving body is no longer under the control of the gyroscope, but will turn toward or with relation to the source of interfering radiant energy.

When the operator at the distant control station desires to terminate permanently or otherwise the responsiveness of the vessel or other moving body to the source of interfering radiant energy, then by the transmission of suitable impulses the commutator 36 is turned, thereby withdrawing the contact 37 from the brush 38, and hence automatically the vessel is restored to the control of the gyroscope 61', which functions as before to maintain the vessel upon the predetermined course.

I have herein referred to the employment of orientation means or mechanism upon the body. I employ the said term in a generic sense and further define such mechanism as azimuth-determining means, which may be of any suitable character. Preferably by said means the vessel or other moving body is adapted to be turned toward the source of interfering radiant energy, though within the scope of my invention it may be turned with relation thereto.

It will be understood that when selenium cells, such as diagrammatically indicated at 20, 21 are employed, the steering mechanism of the vessel is so turned as to cause the latter to assume a position in which both such cells receive an equal amount of energy.

From the foregoing description, it will be evident that the movable body, such, for example, as a torpedo, may be permitted to be controlled by interfering radiant energy emanating from the enemy, as in the case of the projection by the enemy of the beam of a searchlight upon the torpedo and the selenium cells function to effect the turning of the torpedo, so as to face the source of light, and thereby be attracted by it.

In accordance with my invention, I provide means whereby the operator at some suitable control station may arrest such turning or attractive movement of the torpedo, if desired. I have furthermore provided mechanism permitting such operator at the control station to have complete control of all functions relating to the steering of the torpedo. Since preferably I employ a gyroscope to maintain the direction of movement of the torpedo, it is important that the gyroscope should in turn be controlled by the orientation mechanism, so that the attraction of the enemy by interfering radiant energy temporarily and preferably automatically disconnects the gyroscope and permits the torpedo to face in the direction of the source of interfering radiant energy.

It is not essential that all features of my invention be used conjointly, though preferably and to obtain the best results, they are so employed.

Having thus described one illustrative embodiment of my invention, I desire it to be understood that although specific terms are employed, they are used in a generic and descriptive sense and not for purposes of limitation, the scope of the invention being set forth in the following claims.

Claims:

1. A system for the control of moving bodies at a distance by radiant energy, comprising in combination, a body having means to maintain a predetermined or definite direction of bodily movement thereof, and also having means for directing said body toward a source of interfering radiant energy, means for automatically terminating the control of said body by said first mentioned means upon energization of said second mentioned means, and means responsive to radiant energy to terminate the movement of said body toward said source of interfering radiant energy.

2. A system for the control of moving bodies at a distance by radiant energy, comprising in combination, a body having means to maintain a predetermined or definite direction of bodily movement thereof, and also having means for directing said body toward a source of interfering radiant energy, means for automatically terminating the control of said body by said first mentioned means upon energization of said second mentioned means, and means responsive to radiant energy and operable independently of said second mentioned means to terminate the control of said body by said second mentioned means.

3. A system for the control of moving bodies at a distance by radiant energy, comprising in combination, a body having means to maintain a predetermined or definite direction of bodily movement thereof, and also having means for directing said body toward a source of interfering radiant energy, means for automatically modifying the control of said body by said first mentioned means upon energization of said second mentioned means, and means responsive to radiant energy to terminate the movement of said body toward said source of interfering radiant energy.

4. A system for the control of moving bodies at a distance by radiant energy, comprising in combination, a body having means to maintain a predetermined or definite direction of bodily movement thereof, and also having means for directing said body toward a source of interfering radiant energy, means for automatically modifying the control of said body by said first mentioned means upon energization of said second mentioned means, and means responsive to radiant energy and operable independently of said second mentioned means to terminate the control of said body by said second mentioned means.

5. A system for the control of moving bodies at a distance by radiant energy, comprising in combination, a body having a gyroscope to maintain a predetermined or definite direction of bodily movement thereof, and also having means for directing said body toward a source of interfering radiant energy, means for automatically terminating the control of said body by said gyroscope upon energization of said first mentioned means, and means responsive to radiant energy and operable independently of said first mentioned means to terminate the control of said body by said first mentioned means.

6. A system for the control of moving bodies at a distance by radiant energy, comprising in combination, a body having a gyroscope to maintain a predetermined or definite direction of bodily movement thereof, and also having means for directing said body toward a source of interfering radiant energy, means for automatically modifying the control of said body by said gyroscope upon energization of said first mentioned means, and means responsive to radiant energy and operable independently of said first mentioned means to terminate the control of said body by said first mentioned means.

7. A system for the control of moving bodies at a distance by radiant energy, comprising in combination, a body having means to maintain a predetermined or definite direction of bodily movement thereof, and also having means for directing said body toward a source of interfering radiant energy, means for automatically modifying the control of said body by said first mentioned means upon energization of said second mentioned means, and means responsive to radiant energy and operable independently of said second mentioned means to vary the effectiveness of said second mentioned means upon said body.

8. A system for the control of moving bodies at a distance by radiant energy, comprising in combination, a body having means to maintain a predetermined or definite direction of bodily movement thereof, and also having means for directing said body toward a source of interfering radiant energy, means for automatically modifying the control of said body by said first mentioned means upon energization of said second mentioned means, and means responsive to radiant energy and operable independently of said second mentioned means to render said mentioned means selectively either effective or non-effective to control said body while said second mentioned means is under the influence of interfering radiant energy from said source.

9. In a system of distant control, the combination with a movable body, of steering means carried by said body, orientation means responsive to radiant energy and automatically and continuously operative while under the continuous influence of radiant energy from a given source to cause said steering means to automatically and continuously direct said body towards said source while said body is advancing, and means responsive to radiant energy received from a distance and operable independently of said orientation means to modify the control of said steering means by said orientation means.

10. In a system of distant control, the combination with a movable body, of steering means carried by said body, orientation means responsive to radiant energy and automatically and continuously operative while under the continuous influence of radiant energy from a given source to cause said steering means to automatically and continuously direct said body towards said source while said body is advancing, and means responsive to radiant energy received from a distance and operable independently of said orientation means to terminate the control of said steering means by said orientation means.

11. In a system of distant control, the combination with a movable body, of steering means carried by said body, orientation means responsive to radiant energy and automatically and continuously operative while under the continuous influence of radiant energy from a given source to cause said steering means to automatically and continuously direct said body towards said source while said body is advancing, and means responsive to radiant energy received from a distance and operable independently of said orientation means to interrupt the control of said steering means by said orientation means.

12. In a system of distant control, the combination with a movable body, of steering means carried by said body, orientation means responsive to radiant energy and automatically and continuously operative while under the continuous influence of radiant energy from a given source to cause said steering means to automatically and continuously direct said body towards said source while said body is advancing, and means responsive to radiant energy received from a distance and operable independently of said orientation means to render said orientation means while under the influence of radiant energy from said source either effective or non-effective to control said steering means.

13. In a system of distant control, the combination with a movable body, of steering means carried by said body, orientation means responsive to radiant energy and automatically and continuously operative while under the continuous influence of radiant energy from a given source to cause said steering means to automatically and continuously direct said body towards said source while said body is advancing, and means responsive to radiant energy received from a distance to render said orientation means while under the influence of radiant energy from said source either effective or non-effective to control said steering means.

14. In a system of distant control, the combination with a movable body, of steering means carried by said body, and orientation means carried by said body and automatically operative while under the influence of radiant energy from a distant source to cause said steering means to direct said body towards said source while said body is progressing, said orientation means including means responsive to electromagnetic waves and also means responsive to light waves.

15. In a system of distant control, the combination with a movable body, of steering means carried by said body, and orientation means carried by said body and automatically operative while under the influence of radiant energy from a distant source to cause said steering means to direct said body towards said source while said body is progressing, said orientation means including an antenna responsive to electromagnetic waves and a selenium cell.

16. A system for the control of moving bodies at a distance by radiant energy comprising in combination, a vessel having a gyroscope to maintain a predetermined or definite direction of bodily movement thereof and also having orientation means for directing said vessel toward a source of interfering radiant energy, means for automatically terminating the control of said vessel by said gyroscope upon energization of said orientation means, and means responsive to radiant energy from a distant control station to terminate the movement of the vessel toward said source of interfering radiant energy.

17. In a system of radio control, the combination with a movable body of means responsive to radiant energy carried by said body and automatically operative while under the continuous influence of radiant energy from a given source, and as a result of said influence, to cause said body to remain in or to assume a position of rotation predetermined at any given time by the direction of the source of said radiant energy from said body at said time, and means responsive to radiant energy for modifying the action of said first mentioned means upon said body.

18. In a system of radio control, the combination with a movable body of means responsive to electroradiant energy carried by said body and automatically operative while under the continuous influence of electroradiant energy from a given source, and as a result of said influence, to cause said body to remain in or to assume a position of rotation predetermined at any given time by the direction of the source of said electroradiant energy from said body at said time, and means responsive to radiant energy for modifying the action of said first mentioned means upon said body.

19. In a system of radio control, the combination with a movable body of means responsive to radiant energy carried by said body and automatically operative while under the continuous influence of radiant energy from a given source, and as a result of said influence, to cause said body to remain in or to assume a position of rotation predetermined at any given time by the direction of the source of said radiant energy from said body at said time, and means responsive to radiant energy for rendering said first mentioned means ineffective through any desired period of time to control said body.

20. In a system of radio control, the combination with a movable body of means responsive to electroradiant energy carried by said body and automatically operative while under the continuous influence of electroradiant energy from a given source, and as a result of said influence, to cause said body to remain in or to assume a position of rotation predetermined at any given time by the direction of the source of said electroradiant energy from said body at said time, and means responsive to radiant energy for rendering said first mentioned means ineffective through any desired period of time to control said body.

21. In a system of radio control, the combination with a movable body of means responsive to radiant energy carried by said body and automatically operative while under the continuous influence of radiant energy from a given source, and as a result of said influence, to cause said body to remain in or to assume a position of rotation predetermined at any given time by the direction of the source of said radiant energy from said body at said time, and means responsive to radiant energy for terminating the control of said body by said first mentioned means.

22. In a system of radio control, the combination with a movable body of means responsive to electroradiant energy carried by said body and automatically operative while under the continuous influence of electroradiant energy from a given source, and as a result of said influence, to cause said body to remain in or to assume a position of rotation predetermined at any given time by the direction of the source of said electroradiant energy from said body at said time, and means responsive to radiant energy for terminating the control of said body by said first mentioned means.

23. In a system of distant control, the combination with a movable body, of means responsive to radiant energy carried by said body and automatically operative while under the continuous influence of radiant energy from a given source, and as a result thereof to cause said body to be directed substantially in a line extending from said source through said body, and means responsive to radiant energy for modifying the control of said body by said first mentioned means.

24. In a system of distant control, the combination with a movable body, of means responsive to electroradiant energy carried by said body and automatically operative while under the continuous influence of electroradiant energy from a given source, and as a result thereof to cause said body to be directed substantially in a line extending from said source through said body, and means responsive to radiant energy for modifying the control of said body by said first mentioned means.

25. In a system of distant control, the combination with a movable body, of means responsive to electroradiant energy carried by said body and automatically operative while under the continuous influence of electroradiant energy from a given source, and as a result thereof to cause said body to be directed substantially in a line extending from said source through said body, and means responsive to electroradiant energy for modifying the control of said body by said first mentioned means.

26. In a system of distant control, the combination with a movable body, of means responsive to radiant energy carried by said body and automatically operative while under the continuous influence of radiant energy from a given source, and as a result thereof to cause said body to be directed substantially in a line extending from said source through said body, and means responsive to radiant energy to temporarily terminate the control of said body by said first mentioned means.

27. In a system of distant control, the combination with a movable body of means responsive to radiant energy carried by said body and automatically operative while under the continuous influence of radiant energy from a given source, and as a result of said influence to cause said body to remain in or to assume a position of rotation predetermined by the direction of the source of said radiant energy from said boat, and means responsive to radiant energy for modifying the control of the said boat by said first mentioned means.

28. In a system of distant control, the combination with a movable body, of means responsive to electroradiant energy carried by said body and automatically operative while under the continuous influence of electroradiant energy from a given source, and as a result of said influence to cause said body to remain in or to assume a position of rotation predetermined by the direction of the source of said electroradiant energy from said boat, and means responsive to radiant energy for modifying the control of said body by said first mentioned means.

29. In a system of radio control, the combination with a movable body of means responsive to radiant energy carried by said body and automatically operative in response to radiant energy from a given source to cause said body to remain in or to assume a position of rotation predetermined by the direction of said source from said body, and means responsive to radiant energy for modifying the action of said first mentioned means through any desired period.

30. In a system of radio control, the combination with a movable body of means responsive to electroradiant energy carried by said body, and automatically operative in response to electroradiant energy from a given source to cause said body to remain in or to assume a position of rotation predetermined by the direction of said source from said body, and means responsive to electroradiant energy for modifying the action of said first mentioned means through any desired period.

31. In a system of radio control, the combination with a movable body, of means responsive to radiant energy carried by said body and automatically operative in response to radiant energy from a given source to cause said body to remain in or to assume a position of rotation predetermined by the direction of said source from said body, and means responsive to radiant energy and operative as a result of the action of radiant energy to render said first mentioned means either effective or ineffective to control said body.

32. In a system of radio control, the combination with a movable body, of means carried by said body and automatically operative in response to radiant energy from a given source, to cause said body to move in a direction predetermined at any given time by the direction of said source from said body at said time, direction maintaining means carried by said body and automatically operative to cause said body to move in a predetermined direction when not under the control of said first mentioned means, and controlling means responsive to radiant energy for causing said body to be selectively controlled through any desired period either by said first mentioned means or by said direction maintaining means.

33. In a system for radio control, the combination with a movable body, of means controlled by radiant energy to cause said body to be attracted to the source of said radiant energy, and means controlled from a distance to terminate the attraction.

34. In a system of radio control, the combination with a movable body, of means controlled by radiant energy to cause said body to be attracted to the source of said radiant energy, and means controlled from a distance to modify the attraction.

35. In a system of radio control, the combination with a movable body, of means controlled by radiant energy to cause said body to be attracted to the source of said radiant energy, and means controlled from a distance to render the attraction selectively effective or ineffective.

36. In a system of radio control, the combination with a movable body, of means controlled by interfering radiant energy to cause said body to be attracted to the source of said radiant energy, and means controlled by radiant energy from a local source to terminate the attraction.

37. In a system for radio control, the combination with a movable body, of means controlled by radiant energy, to cause said body to move towards the source of said radiant energy, and means controlled from a distance to terminate the attraction.

38. In a system of radio control, the combination with a movable body, of means controlled by radiant energy to cause said body to go towards the source of said radiant energy, and means controlled from a distance to modify the attraction.

39. In a system of radio control, the combination with a movable body, of means controlled by radiant energy to cause said body to go towards the source of said radiant energy, and means controlled from a distance to render the attraction selectively effective or ineffective.

40. In a system of radio control, the combination with a movable body, of means controlled by interfering radiant energy to cause said body to go towards the source of said radiant energy, and means controlled by radiant energy from a local source to terminate the attraction.

In testimony whereof, I have signed my name to this specification, in the presence of two subscribing witnesses.

JOHN HAYS HAMMOND, Jr.

Witnesses:
WM. EMERSON PARSONS,
THOMAS W. BROPHY.